United States Patent
Noda (10) Patent No.: US 6,624,953 B2
(45) Date of Patent: Sep. 23, 2003

(54) IMAGE READOUT LENS

(75) Inventor: Takayuki Noda, Saitama (JP)

(73) Assignee: Fuji Photo Optical Co., Ltd., Saitama (JP)

( * ) Notice: Subject to any disclaimer, the term of this patent is extended or adjusted under 35 U.S.C. 154(b) by 0 days.

(21) Appl. No.: 10/093,412

(22) Filed: Mar. 11, 2002

(65) Prior Publication Data

US 2003/0048548 A1 Mar. 13, 2003

(30) Foreign Application Priority Data

Mar. 27, 2001 (JP) ........................................ 2001-090845

(51) Int. Cl.$^7$ .............................. G02B 9/14; G02B 13/18
(52) U.S. Cl. ........................................ 359/785; 359/716
(58) Field of Search ................................. 359/716, 785, 359/789, 790

(56) References Cited

U.S. PATENT DOCUMENTS 4,109,995 A  8/1978  Betensky 6,259,570 B1  7/2001  Noda

FOREIGN PATENT DOCUMENTS

JP  63-135911  6/1988
JP  4-288512  10/1992

*Primary Examiner*—Scott J. Sugarman
*Assistant Examiner*—Darryl J. Collins
(74) *Attorney, Agent, or Firm*—Arnold International; Bruce Y. Arnold (57) ABSTRACT

An image readout lens is formed of three lens groups of positive, positive, and negative refractive power, in order from the object side, with a stop between the second and third lens groups. The first lens group is convex on the object side, the second lens group is made of an optical resin material that is convex on the object side, and the third lens group is made of an optical resin material that is convex on the image side. At least one surface among the surfaces of the second and third lens groups is aspheric, and various conditions are satisfied so as to provide an image readout lens that is small in size, low in cost, provides a sufficiently wide field of view for wide applicability in scanning documents, and has its aberrations favorably corrected so as to enable the image readout lens to scan color documents.

3 Claims, 4 Drawing Sheets

IMAGE READOUT LENS

BACKGROUND OF THE INVENTION

Conventionally, an image readout apparatus which functions to read out information on a document by forming an image of the document onto a photo detecting array, such as a CCD (charge-coupled device) array via an optical system has been developed. There is a demand for such image readout apparatus, more specifically for use with a facsimile machine or digital copying machine, wherein the image readout apparatus have a smaller size, faster reading speed, and lower cost. As these demands have been increasing, there naturally has been an increasing demand for development of an image readout lens having a smaller size, lower cost, and improved brightness.

Japanese Laid Open Patent Application Numbers S63-135911 and H4-288512 disclose examples of conventional image readout lenses. Both image readout lenses disclosed in these publications are configured of three lens groups, with each lens group being formed of a single lens element. Because the readout lens is composed of a small number of lens elements, the readout lenses of these examples are small in size and low in cost.

Although the image readout lens disclosed in Japanese Laid Open Patent Application Number S62-135911 has a bright image due to a low F-number of 4.0, it has a narrow 36° field of view. Therefore, this image readout lens is not suitable for general use due to the limited document size that it can handle. Furthermore, the lens disclosed in Japanese Laid Open Patent Application Number H4-288512 has large chromatic aberrations, both on-axis and off-axis. Therefore, this lens is not suitable for reading out color images.

BRIEF SUMMARY OF THE INVENTION

The present invention is an image readout lens for reading out information on documents, for example. The object of the present invention is to provide an image readout lens which is small in size, low in cost, has a wide-angle field of view, and has its aberrations, including chromatic aberrations, favorably corrected so as to be capable of imaging color originals with high quality.

BRIEF DESCRIPTION OF THE DRAWINGS

The present invention will become more fully understood from the detailed description given below and the accompanying drawings, which are given by way of illustration only and thus are not limitative of the present invention, wherein.

DETAILED DESCRIPTION

Generally speaking, the image readout lens of the present invention is formed of three lens groups having positive, negative, and positive refractive power, respectively, in sequential order from the object side, with a stop positioned between the second lens group and the third lens group. The first lens group is formed of a lens having a convex surface on the object side. The second lens group is formed of a lens having a convex surface on the object side, and the third lens group is formed of a lens having a convex surface on the image side. The lens elements of the second lens group and the third lens group are made of an optical resin material, and at least one surface of a lens element among the second and third lens groups has an aspheric surface which has a curvature defined by Equation (A) below:

$$Z(h) = Ch^2/\{1+(1+KC^2h^2)^{1/2}\} + A_4h^4 + A_6h^6 + A_8h^8 + A_{10}h^{10} \quad \text{Equation (A)}$$

where

Z is the length (in mm) of a line drawn from a point on the aspherical surface at distance h from the optical axis to the tangential plane of the aspherical surface vertex, C (=1/R) is the curvature of the aspherical surface near the optical axis, h is the distance (in mm) from the optical axis, K is the eccentricity, and $A_4$, $A_6$, $A_8$, and $A_{10}$ are the 4th, 6th, 8th, and 10th aspherical coefficients.

The image readout lens in accordance with a first aspect of the present invention satisfies the following conditions:

| | |
|---|---|
| $55 < \nu 3 < 60$ | Condition (1) |
| $29 < \nu 2 < 33$ | Condition (2) |
| $0.3 < |f_2|/f_3 < 0.6$ | Condition (3) |
| $0.41 < |f_2|/f < 1.1$ | Condition (4) |
| $0.8 < f_3/f < 3.3$ | Condition (5A) | where $\nu 3$ is the Abbe number, at the d-line, of the optical material of a lens element of the third lens group, $\nu 2$ is the Abbe number, at the d-line, of the optical material of a lens element of the second lens group, $f_2$ is the focal length of the second lens group, in order from the object side, $f_3$ is the focal length of the third lens group, in order from the object side, and f is the focal length of the image readout lens.

Furthermore, the image readout lens in accordance with a second aspect of the present invention satisfies the following conditions:

| | |
|---|---|
| $55 < \nu 3 < 60$ | Condition (1) |
| $29 < \nu 2 < 33$ | Condition (2) |
| $0.41 < |f_2|/f < 1.1$ | Condition (4) |
| $0.95 < f_3/f < 1.3$ | Condition (5B) |
| $f_1/f < 0.5$ | Condition (6) | where $\nu 3$, $\nu 2$, $f_2$, $f_3$ and f are as defined above, and $f_1$ is the focal length of the first lens group, in order from the object side.

In addition, an image readout lens in accordance with the invention preferably satisfies the following Condition (7):

$$0.8 < |f_{23}|/f < 1.2 \qquad \text{Condition (7)}$$

where $f_{23}$ is the resultant focal length of the second lens group and the third lens group, and f is as defined above.

In addition to the above-mentioned Conditions (1)–(7), the image readout lens in accordance with the invention is preferably configured so as to satisfy the following Conditions (8)–(10):

$$1.7 < R1/D1 < 2.8 \qquad \text{Condition (8)}$$

$$0.18 < R4/f < 0.23 \qquad \text{Condition (9)}$$

$$D2/f < 0.5 \qquad \text{Condition (10)}$$

where

R1 is the radius of curvature of the object-side surface of the first lens group, D1 is the on-axis spacing between the surfaces of the first lens, R4 is the radius of curvature of the image-side surface of the second lens group, and f is as defined above.

Figure 1:
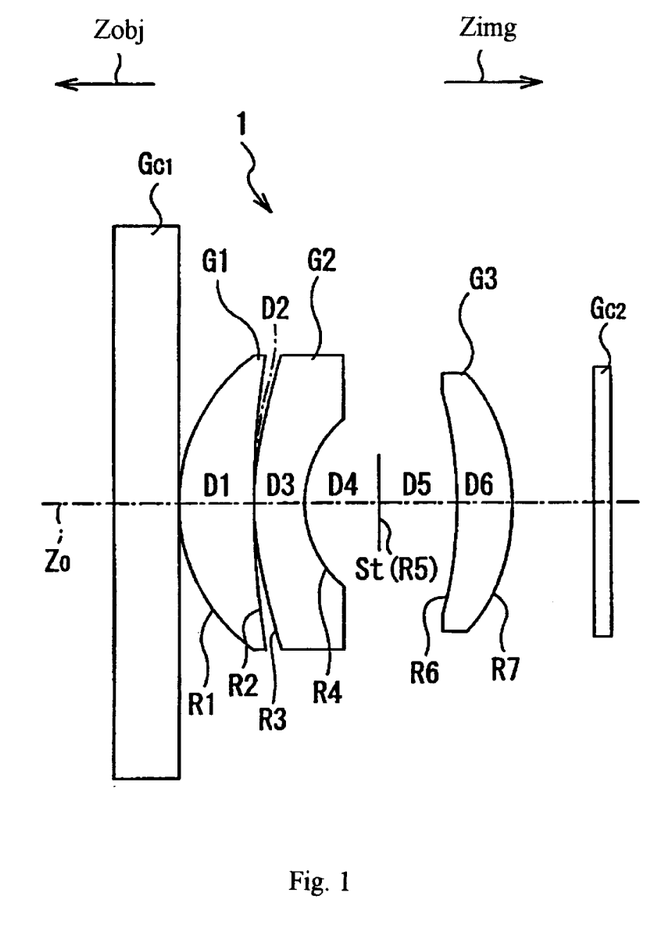
FIG. 1 shows the basic lens configuration of Embodiments 1–3 of the present invention.

The invention will first be discussed in general terms with reference to a drawing. FIG. 1 shows the basic lens configuration according to an embodiment of the present invention, with $Z_0$ being the optical axis, $Z_{OBJ}$ being the object side (i.e., the side on which documents are placed for readout) and $Z_{IMG}$ is the image side. In FIG. 1, the symbols R1, R2, etc. indicate the radii of curvature of the indicated surfaces, the symbols D1, D2, etc. indicate the spacings between surfaces, and the symbol St indicates a stop.

The image readout lens 1 in accordance with the present invention may be used as part of an image readout apparatus such as used in a facsimile machine or digital copy machine, where a photodetector array such as a CCD array is positioned on the image side to capture the image data. As shown in FIG. 1, the image readout lens 1 is formed of, in order from the object side, a first lens group G1, a second lens group G2, and a third lens group G3. A stop St is positioned between the second lens group G2 and the third group G3. In this way, the image readout lens 1 is configured as a triplet having three lens groups, each formed of a single lens. The image readout lens 1 also has a cover glass $G_{C1}$ on the object side of the first lens group G1 and a cover glass $G_{C2}$ on the image side of the third lens group. The cover glass $G_{C1}$ serves mainly to protect the lens surface on the object side of the first lens group G1, and the cover glass $G_{C2}$ serves mainly to protect the surface of the photodetector array.

The first lens group G1 is formed of a positive lens having a convex surface on the object side. The second lens group G2 is formed of a negative lens having a convex surface on the object side. The third lens group G3 is formed of a positive lens having a convex surface on the image side. Optical resin material such as acrylic resin, epoxy resin or polycarbonate is used to form the lens elements of the second lens group G2 and the third lens group G3, and at least one surface among the lens element surfaces of the second and third lens groups is made to be aspheric.

By making at least one surface, among the lens element surfaces of the second and third lens groups aspheric, various optical aberrations can be favorably corrected while providing an image having the required brightness.

By making the lens elements of the second lens group and the third lens group from an optical resin material, there is a reduction in cost of manufacturing when an aspheric surface is formed on one or more of the lens element surfaces of the second lens group and the third lens group. In general, however, a lens made of an optical resin material undergoes changes in its optical properties, such as focal length, when there is a change in the environment, such as temperature and/or humidity. In the image readout lens 1 of the present invention, a change in focal length caused by changes in humidity and temperature may be minimized by using, for each of the second lens group G2 and the third lens group G3, a cemented lens formed of a positive lens element of optical resin material that is cemented to a negative lens element of optical resin material.

In general, in order to correct for chromatic aberration in an optical system having three lens groups of positive, negative, and positive refractive power in order from the object side, with each lens group formed of a single lens, a low dispersion optical material is used for the negative lens and a high dispersion optical material is used for at least one of the positive lenses. Using an optical resin material to form the components of the second lens group G2 and the third lens group G3 results in some design limitations. The above-mentioned Conditions (1) and (2) ensure that chromatic aberration is favorably corrected. When the above Conditions (1) and (2) are not satisfied, the appropriate optical resin materials have not been used and favorable correction of chromatic aberrations will not be achieved.

Condition (3) insures that the spherical aberration and curvature of field are favorably corrected. When the lower limit of Condition (3) is not satisfied, both the spherical aberration and distortion will be under-corrected, resulting in increased astigmatism at medium field angles. If correction of this astigmatism is attempted, the amount of coma increases. When the upper limit of Condition (3) is not satisfied, both the spherical aberration and distortion will be over-corrected, resulting in the amount of negative distortion increasing. If one attempts to balance these aberrations using other aberrations, once again the amount of coma will increase.

Condition (4) insures favorable correction of spherical aberration and curvature of field. When the lower limit of Condition (4) is not satisfied, both the spherical aberration and distortion will be under-corrected, resulting in increased astigmatism at medium field angles. As before, the amount of coma increases if correction is attempted. When the upper limit of Condition (4) is not satisfied, both the spherical aberration and distortion will be over-corrected, resulting in there being negative distortion. Once again, if one attempts to balance these aberrations using other aberrations, the amount of coma will increase.

Conditions (5A), (5B), and (7) are mainly for correction of distortion. When the lower limits of these conditions are not satisfied, the amount of negative distortion increases. When the upper limits of these conditions are not satisfied, the amount of positive distortion increases to a point that it becomes difficult to balance out the distortion using other aberrations.

Condition (6) insures favorable correction of spherical aberration and curvature of field. When the lower limit of Condition (6) is not satisfied, the spherical aberration is under-corrected. When the upper limit of Condition (6) is exceeded, the spherical aberration will be over-corrected, making a proper balance with the curvature of field difficult to obtain.

Condition (8) insures favorable correction of coma under the Conditions (5A) and (7), or Conditions (5B) and (7). When the lower limit of Condition (8) is not satisfied, an outward coma flare is generated so as to increase the amount of coma at medium field angles. When the upper limit of Condition (8) is not satisfied, an inward coma flare is generated so as to increase the amount of coma and decrease the image quality.

Condition (9) insures favorable correction of spherical aberration and curvature of field. When the lower limit of Condition (9) is not satisfied, the spherical aberration will be under-corrected, and when the upper limit of the Condition (9) is not satisfied, the spherical aberration will be over-corrected, making a proper balance with the curvature of field difficult to obtain.

Condition (10) insures favorable correction of spherical aberration and curvature of field. When the upper limit of Condition (10) is not satisfied, the spherical aberration will be over-corrected, making a proper balance with the curvature of field difficult to obtain.

Several embodiments of the image readout lens according to the invention will now be set forth in detail.

Embodiment 1

FIG. 1 illustrates the basic lens configuration of this embodiment. As this figure was discussed above concerning the invention in general, further discussion here will be omitted.

Table 1 below lists, in order from the object side, the Group number G, the surface number #, the radius of curvature R (in mm) near the optical axis, the on-axis spacing D (in mm) between surfaces, as well as the index of refraction $N_d$ and the Abbe number $v_d$ (both at the d-line, line, i.e., λ=587.6 nm) of each lens element of the image readout lens according to Embodiment 1. The numerical data regarding the cover glasses $G_{C1}$ and $G_{C2}$ are omitted from the table. In the present embodiment, the cover glass $G_{C1}$ has an index of refraction of 1.51 and a thickness of 7.0 mm, and the cover glass $G_{C2}$ has an index of refraction of 1.51 and a thickness of 1.75 mm. Those surfaces that are aspherical in Table 1 are listed with a * to the right of the surface number. In the middle portion of the table are listed the focal length f (the table data has been normalized, for convenience, so that f equals 100 mm), the f-number $F_{NO.}$, the image magnification m, the image angle 2ω (in degrees) and the maximum image height Y (in mm) for the present embodiment. In the bottom portion of the table are listed the aspherical constants of the aspherical surfaces. These constants define the shape of the aspherical surfaces 3, 4, 6 and 7 according to Equation (A) above. An "E" in the data listed in the bottom portion of the table indicates that the number following the "E" is the exponent to the base 10. For example, "1.0E-02" represents the number $1.0 \times 10^{-2}$.

TABLE 1

| G | # | R | D | $N_d$ | $v_d$ |
|---|---|---|---|---|---|
| 1 | 1 | 26.21 | 13.98 | 1.7031 | 54.4 |
| 1 | 2 | 136.51 | 0.00 | | |
| 2 | 3* | 91.95 | 3.76 | 1.5961 | 31.0 |
| 2 | 4* | 18.64 | 9.55 | | |
| (Stop) | 5 | ∞ | 2.43 | | |
| 3 | 6* | -42.70 | 9.11 | 1.4923 | 57.5 |
| 3 | 7* | -26.34 | 5.00 | | |

| f = 100 | $F_{NO.}$ = 7.13 | m = 0.190 | 2ω = 46.6° | Y = 270 |
|---|---|---|---|---|

| # | K | $A_4$ | $A_6$ | $A_8$ | $A_{10}$ |
|---|---|---|---|---|---|
| 3 | 1.0 | -0.3450525E-05 | 0.2542504E-08 | 0.0 | 0.0 |
| 4 | 1.0 | 0.5380920E-05 | 0.2179542E-07 | 0.0 | 0.0 |

TABLE 1-continued

| 6 | 1.0 | -0.2407739E-04 | -0.6683282E-07 | 0.0 | 0.0 |
|---|---|---|---|---|---|
| 7 | 1.0 | -0.1372718E-04 | -0.5893919E-07 | 0.0 | 0.0 |

Table 2 below lists the values for this embodiment that correspond to Conditions (1)–(10).

TABLE 2

| Condition (1) value of v3: | 57.5 |
|---|---|
| Condition (2) value of v2: | 31.0 |
| Condition (3) value of $|f_2|/f_3$: | 0.336 |
| Condition (4) value of $|f_2|/f$: | 1.00 |
| Condition (5A) or (5B) value of $f_3/f$: | 2.98 |
| Condition (6) value of $f_1/f$: | 1.11 |
| Condition (7) value of $|f_{23}|/f$: | 0.886 |
| Condition (8) value of R1/D1: | 1.87 |
| Condition (9) value of R4/f: | 0.1864 |
| Condition (10) value of D2/f: | 0.0 |

As is apparent from comparing the above listed values to the above Conditions (1)–(10), Embodiment 1 satisfies each of Conditions (1)–(4), (5A) and (7)–(10).

Figure 3A:
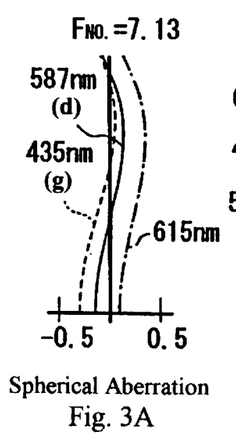
FIGS. 3A–3D show the spherical aberration, astigmatism, distortion, and lateral color, respectively, of the image readout lens in accordance with Embodiment 1.
Figure 3B:
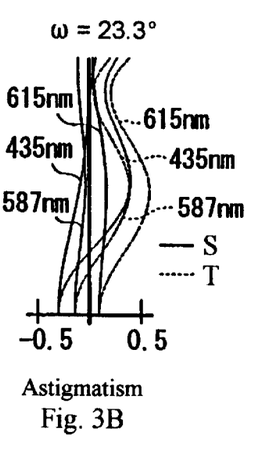
Figure 3C:
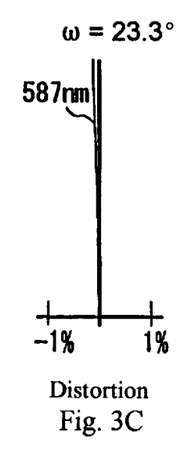
Figure 3D:
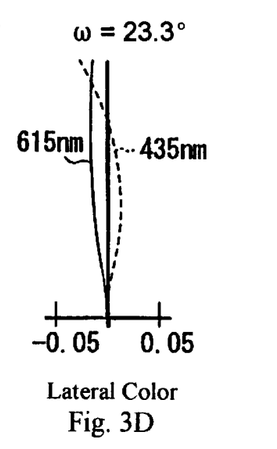

FIGS. 3A–3D show the spherical aberration (in mm), astigmatism (in mm), distortion, and lateral color (in mm), respectively, of the image readout lens of Embodiment 1. In FIG. 3B, the astigmatism is shown for both the sagittal S and tangential T image surfaces. Furthermore, ω indicates the half-image angle. As is apparent from viewing these figures, the various aberrations are favorably corrected in this embodiment.

Embodiment 2

The basic lens configuration of this embodiment is the same as that of Embodiment 1, and thus is shown in FIG. 1.

Table 3 below lists, in order from the object side, the Group number G, the surface number #, the radius of curvature R (in mm) near the optical axis, the on-axis spacing D (in mm) between surfaces, as well as the index of refraction $N_d$ and the Abbe number $v_d$ (both at the d-line, i.e., λ=587.6 nm) of each lens element of the image readout lens according to Embodiment 2. The numerical data regarding the cover glasses $G_{C1}$ and $G_{C2}$ are omitted from the table. In the present embodiment, the cover glass $G_{C1}$ has an index of refraction of 1.51 and a thickness of 7.0 mm, and the cover glass $G_{C2}$ has an index of refraction of 1.51 and a thickness of 1.75 mm. Those surfaces that are aspherical in Table 3 are listed with a * to the right of the surface number. In the middle portion of the table are listed the focal length f (the table data has been normalized, for convenience, so that f equals 100 mm), the f-number FNO., the image magnification m, the image angle 2ω (in degrees) and the maximum image height Y (in mm) for the present embodiment. In the bottom portion of the table are listed the aspherical constants of the aspherical surfaces. These constants define the shape of the aspherical surfaces 3, 4, 6 and 7 according to Equation (A) above. An "E" in the data listed in the bottom portion of the table indicates that the number following the "E" is the exponent to the base 10. For example, "1.0E-02" represents the number $1.0 \times 10^{-2}$.

TABLE 3

| G | # | R | D | $N_d$ | $v_d$ |
|---|---|---|---|---|---|
| 1 | 1 | 30.03 | 11.43 | 1.7757 | 50.8 |
| 1 | 2 | 173.40 | 0.08 | | |
| 2 | 3* | 150.14 | 6.01 | 1.5882 | 30.3 |
| 2 | 4* | 21.11 | 8.76 | | |
| (Stop) | 5 | ∞ | 1.86 | | |
| 3 | 6* | −52.70 | 11.91 | 1.4923 | 57.5 |
| 3 | 7* | −29.72 | 5.00 | | | f = 100   $F_{NO.}$ = 7.13   m = 0.190   2ω = 46.6°   Y = 270

| # | K | $A_4$ | $A_6$ | $A_8$ | $A_{10}$ |
|---|---|---|---|---|---|
| 3 | 1.0 | −0.1056219E−05 | 0.6325647E−09 | 0.0 | 0.0 |
| 4 | 1.0 | 0.4885824E−05 | 0.2916964E−08 | 0.0 | 0.0 |
| 6 | 1.0 | −0.1602764E−04 | −0.3346712E−07 | 0.0 | 0.0 |
| 7 | 1.0 | −0.7834033E−05 | −0.3339883E−07 | 0.0 | 0.0 |

Table 4 below lists the values for this embodiment that correspond to Conditions (1)–(10).

TABLE 4

| Condition (1) value of v3: | 57.5 |
|---|---|
| Condition (2) value of v2: | 30.3 |
| Condition (3) value of $|f_2|/f_3$: | 0.356 |
| Condition (4) value of $|f_2|/f$: | 0.52 |
| Condition (5A) or (5B) value of $f_3/f$: | 1.46 |
| Condition (6) value of $f_1/f$: | 0.56 |
| Condition (7) value of $|f_{23}|/f$: | 1.00 |
| Condition (8) value of R1/D1: | 2.63 |
| Condition (9) value of R4/f: | 0.2111 |
| Condition (10) value of D2/f: | 0.0008 |

As is apparent from comparing the above listed values to the above Conditions (1)–(10), Embodiment 2 satisfies each of Conditions (1)–(4), (5A) and (7)–(10).

Figures 4A, 4B:
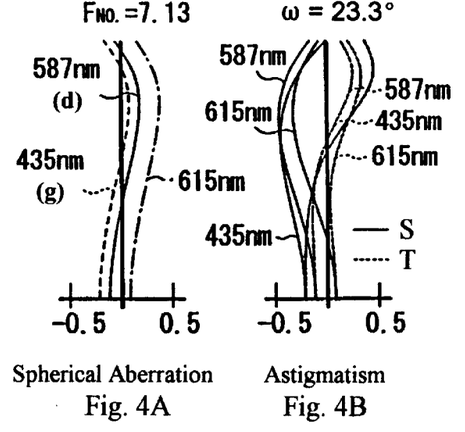
FIGS. 4A–4D show the spherical aberration, astigmatism, distortion, and lateral color, respectively, of the image readout lens in accordance with Embodiment 2.
Figure 4C:
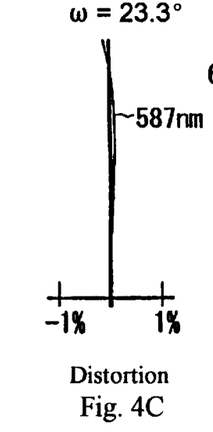
Figure 4D:
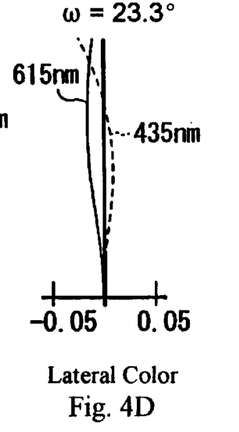

FIGS. 4A–4D show the spherical aberration (in mm), astigmatism (in mm), distortion, and lateral color (in mm), respectively, of the image readout lens of Embodiment 2. In FIG. 4B, the astigmatism is shown for both the sagittal S and tangential T image surfaces. Furthermore, ω indicates the half-image angle. As is apparent from viewing these figures, the various aberrations are favorably corrected in this embodiment.

Embodiment 3

The basic lens configuration of this embodiment is the same as that of Embodiment 1, and thus is shown in FIG. 1.

Table 5 below lists, in order from the object side, the Group number G, the surface number #, the radius of curvature R (in mm) near the optical axis, the on-axis spacing D (in mm) between surfaces, as well as the index of refraction $N_d$ and the Abbe number $v_d$ (both at the d-line, i.e., λ=587.6 nm) of each lens element of the image readout lens according to Embodiment 3. The numerical data regarding the cover glasses $G_{C1}$ and $G_{C2}$ are omitted from the table. In the present embodiment, the cover glass $G_{C1}$ has an index of refraction of 1.51 and a thickness of 7.0 mm, and the cover glass $G_{C2}$ has an index of refraction of 1.51 and a thickness of 1.75 mm. Those surfaces that are aspherical in Table 5 are listed with a * to the right of the surface number. In the middle portion of the table are listed the focal length f (the table data has been normalized, for convenience, so that f equals 100 mm), the f-number $F_{NO.}$, the image magnification m, the image angle 2ω (in degrees) and the maximum image height Y (in mm) for the present embodiment. In the bottom portion of the table are listed the aspherical constants of the aspherical surfaces. These constants define the shape of the aspherical surfaces 3, 4, 6 and 7 according to Equation (A) above. An "E" in the data listed in the bottom portion of the table indicates that the number following the "E" is the exponent to the base 10. For example, "1.0E-02" represents the number $1.0 \times 10^{-2}$.

TABLE 5

| G | # | R | D | $N_d$ | $v_d$ |
|---|---|---|---|---|---|
| 1 | 1 | 32.61 | 13.36 | 1.7802 | 50.3 |
| 1 | 2 | 280.10 | 0.13 | | |
| 2 | 3* | 346.67 | 5.52 | 1.5882 | 30.3 |
| 2 | 4* | 22.66 | 6.71 | | |
| (Stop) | 5 | ∞ | 0.82 | | |
| 3 | 6* | −59.76 | 13.59 | 1.4923 | 57.5 |
| 3 | 7* | −29.90 | 5.02 | | | f = 100   $F_{NO.}$ = 7.13   m = 0.190   2ω = 46.6°   Y = 270

| # | K | $A_4$ | $A_6$ | $A_8$ | $A_{10}$ |
|---|---|---|---|---|---|
| 3 | 1.0 | 0.8964586E−06 | −0.1044664E−08 | 0.0 | 0.0 |
| 4 | 1.0 | 0.7495504E−05 | 0.2095095E−07 | 0.0 | 0.0 |
| 6 | 1.0 | −0.1259628E−04 | −0.3020963E−07 | 0.0 | 0.0 |
| 7 | 1.0 | −0.6511991E−05 | −0.3239343E−07 | 0.0 | 0.0 |

Table 6 below lists the values for this embodiment that correspond to Conditions (1)–(10).

TABLE 6

| Condition (1) value of v3: | 57.5 |
|---|---|
| Condition (2) value of v2: | 30.3 |
| Condition (3) value of $|f_2|/f_3$: | 0.386 |
| Condition (4) value of $|f_2|/f$: | 0.42 |
| Condition (5A) or (5B) value of $f_3/f$: | 1.06 |
| Condition (6) value of $f_1/f$: | 0.46 |
| Condition (7) value of $|f_{23}|/f$: | 1.065 |
| Condition (8) value of R1/D1: | 2.44 |
| Condition (9) value of R4/f: | 0.2266 |
| Condition (10) value of D2/f: | 0.0013 |

As is apparent from comparing the above listed values to the above Conditions (1)–(10), Embodiment 3 satisfies each of Conditions (1)–(4), (5B), and (6)–(10). Because Condition (5B) is more strict than Condition (5A), this embodiment, in fact, satisfies each condition.

Figures 5A, 5B:
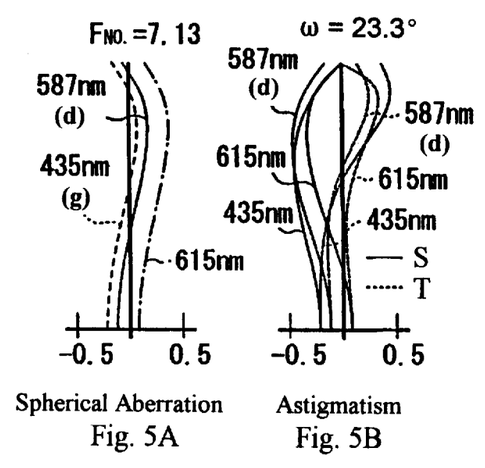
FIGS. 5A–5D show the spherical aberration, astigmatism, distortion, and lateral color, respectively, of the image readout lens in accordance with Embodiment 3.
Figure 5C:
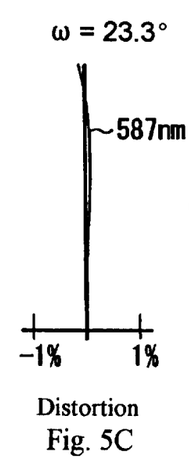
Figure 5D:
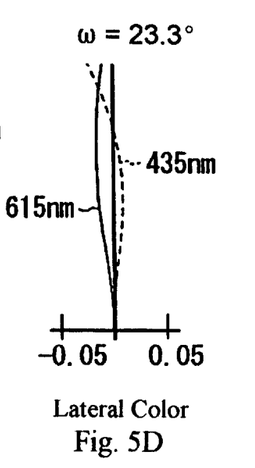

FIGS. 5A–5D show the spherical aberration (in mm), astigmatism (in mm), distortion, and lateral color (in mm), respectively, of the image readout lens of Embodiment 3. In FIG. 5B, the astigmatism is shown for both the sagittal S and tangential T image surfaces. Furthermore, ω indicates the half-image angle. As is apparent from viewing these figures, the various aberrations are favorably corrected in this embodiment.

Embodiment 4

Figure 2:
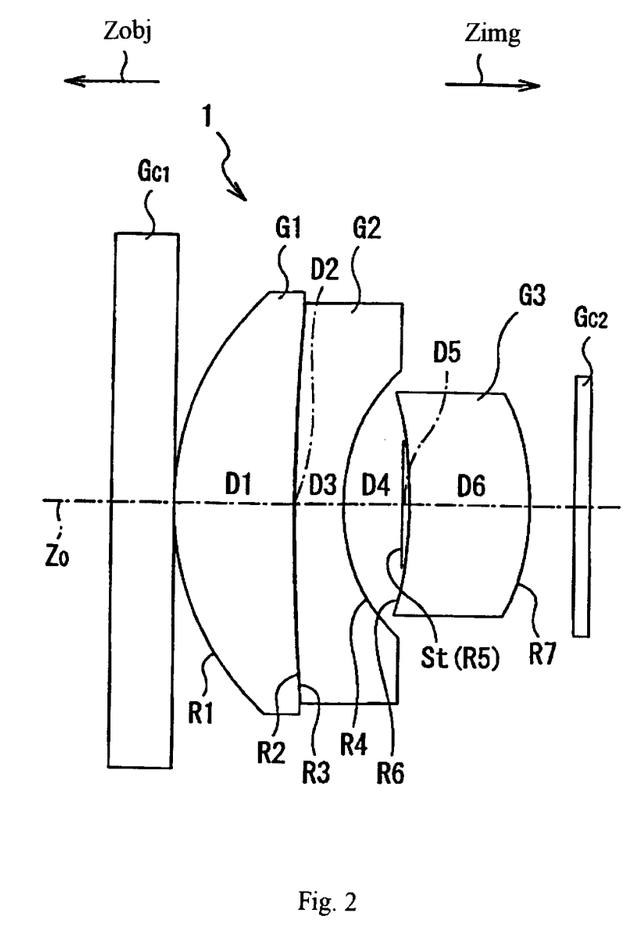
FIG. 2 shows the basis lens configuration of Embodiment 4 of the present invention.

The basic lens configuration of this embodiment is shown in FIG. 2. The lens configuration of this embodiment is similar to that of FIG. 1 but differs in that, in this embodiment the surfaces 2 and 3 have the same radius of curvature and are in contact with one another.

Table 7 below lists, in order from the object side, the Group number G, the surface number #, the radius of curvature R (in mm) near the optical axis, the on-axis spacing D (in mm) between surfaces, as well as the index of refraction $N_d$ and the Abbe number $v_d$ (both at the d-line, i.e., λ=587.6 nm) of each lens element of the image readout lens according to Embodiment 4. The numerical data regarding the cover glasses $G_{C1}$ and $G_{C2}$ are omitted from the table. In the present embodiment, the cover glass $G_{C1}$ has an index of refraction of 1.51 and a thickness of 7.0 mm, and the cover glass $G_{C2}$ has an index of refraction of 1.51 and a thickness of 1.75 mm. Those surfaces that are aspherical in Table 7 are listed with a * to the right of the surface number. In the middle portion of the table are listed the focal length f (the table data has been normalized, for convenience, so that f equals 100 mm), the f-number $F_{NO.}$, the image magnification m, the image angle 2ω (in degrees) and the maximum image height Y (in mm) for the present embodiment. In the bottom portion of the table are listed the aspherical constants of the aspherical surfaces. These constants define the shape of the aspherical surfaces 3, 4, 6 and 7 according to Equation (A) above. An "E" in the data listed in the bottom portion of the table hat the number following the "E" is the exponent to the base 10. For example, represents the number $1.0 \times 10^{-2}$.

TABLE 7

| G | # | R | D | $N_d$ | $v_d$ |
|---|---|---|---|---|---|
| 1 | 1 | 32.62 | 13.62 | 1.7866 | 49.7 |
| 1 | 2 | 226.20 | 0.00 | | |
| 2 | 3* | 226.20 | 5.52 | 1.5882 | 30.3 |
| 2 | 4* | 21.89 | 5.99 | | |
| (Stop) | 5 | ∞ | 1.27 | | |
| 3 | 6* | −62.91 | 13.56 | 1.4923 | 57.5 |
| 3 | 7* | −30.03 | 5.02 | | |

| f = 100 | $F_{NO.}$ = 7.13 | m = 0.190 | 2ω = 46.6° | Y = 270 |
|---|---|---|---|---|

| # | K | $A_4$ | $A_6$ | $A_8$ | $A_{10}$ |
|---|---|---|---|---|---|
| 3 | 1.0 | 0.8964586E−06 | −0.1044664E−08 | 0.0 | 0.0 |
| 4 | 1.0 | 0.7495504E−05 | 0.2095095E−07 | 0.0 | 0.0 |
| 6 | 1.0 | −0.1259628E−04 | −0.3020963E−07 | 0.0 | 0.0 |
| 7 | 1.0 | −0.6511991E−05 | −0.3239343E−07 | 0.0 | 0.0 |

Table 8 below lists the values for this embodiment that correspond to Conditions (1)–(10).

TABLE 8

| Condition (1) value of v3: | 57.5 |
|---|---|
| Condition (2) value of v2: | 30.3 |
| Condition (3) value of $|f_2|/f_3$: | 0.407 |
| Condition (4) value of $|f_2|/f$: | 0.42 |
| Condition (5A) or (5B) value of $f_3/f$: | 1.03 |
| Condition (6) value of $f_1/f$: | 0.47 |
| Condition (7) value of $|f_{23}|/f$: | 1.096 |
| Condition (8) value of R1/D1: | 2.40 |
| Condition (9) value of R4/f: | 0.2189 |
| Condition (10) value of D2/f: | 0.0000 |

As is apparent from comparing the above listed values to the above Conditions (1)–(10), Embodiment 4 satisfies each of Conditions (1)–(4), (5B), and (6)–(10). Because Condition (5B) is more strict than Condition (5A), this embodiment, in fact, satisfies each condition.

Figures 6A, 6B:
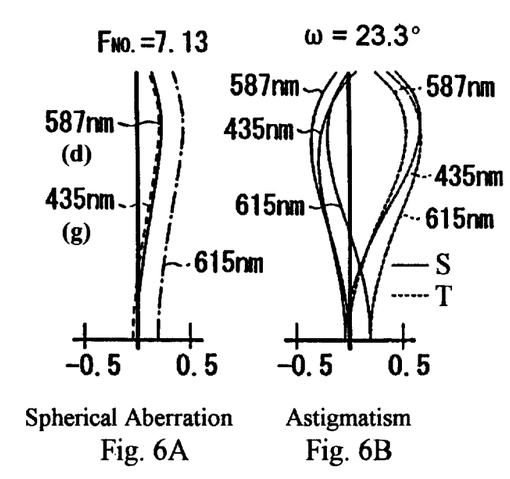
FIGS. 6A–6D show the spherical aberration, astigmatism, distortion, and lateral color, respectively, of the image readout lens in accordance with Embodiment 4.
Figure 6C:
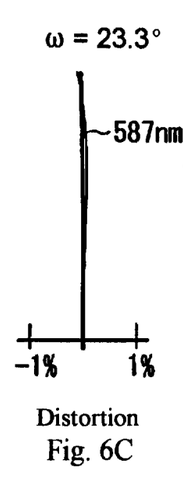
Figure 6D:
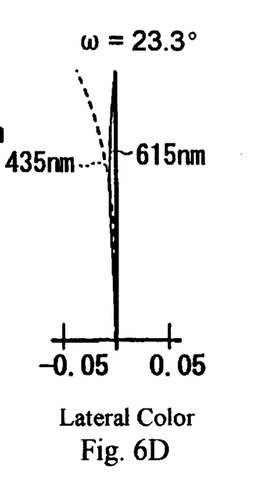

FIGS. 6A–6D show the spherical aberration (in mm), astigmatism (in mm), distortion, and lateral color (in mm), respectively, of the image readout lens of Embodiment 4. In FIG. 6B, the astigmatism is shown for both the sagittal S and tangential T image surfaces. Furthermore, ω indicates the half-image angle. As is apparent from viewing these figures, the various aberrations are favorably corrected in this embodiment.

As described above, the aberrations are favorably corrected in the image readout lens in accordance with all of the Embodiments. Furthermore, although a relatively high refractive index optical material (and thus a moderately expensive optical material) is used as the lens for the third lens group G3 in each embodiment, this lens is small in size since the distance between the third lens group and the stop St is small. Thus, the amount of lens material needed for this lens is small and the readout lens of the invention is inexpensive to produce while providing an image angle of 46.6°.

The invention being thus described, it will be obvious that the same may be varied in many ways. For example, the radii of curvature R, lens spacings D, refractive index $N_d$ and Abbe number $v_d$ of each lens element can be changed appropriately. Furthermore, although cover glasses are used in the above-described embodiments, a configuration without cover glasses can be used. Such variations are not to be regarded as a departure from the spirit and scope of the invention. Rather, the scope of the invention shall be defined as set forth in the following claims and their legal equivalents. All such modifications as would be obvious to one skilled in the art are intended to be included within the scope of the following claims.

What is claimed is:

1. An image readout lens comprising three lens groups of positive, negative and positive refractive power, in successive order from the object side, and a stop located between the second lens group and the third lens group, wherein:

the first lens group is formed of a lens having a-convex surface on the object side;

the second lens group is formed of a lens made of an optical resin material having a convex surface on the object side;

the third lens group is formed of a lens made of an optical resin material having a convex surface on the image side;

at least one surface, of among the surfaces of the second lens group and the third lens group, is an aspheric surface; and the following conditions are satisfied:

$$55 < v3 < 60$$

$$29 < v2 < 33$$

$$0.3 < |f_2|/f_3 < 0.6$$

$$0.41 < |f_2|/f < 1.1$$

$$0.8 < f_3/f < 3.3$$

where v3 is the Abbe number, at the d line, of the optical material of a lens element in the third lens group, v2 is the Abbe number, at the d line, of the optical material of a lens element in the second lens group, $f_2$ is the focal length of the second lens group, $f_3$ is the focal length of the third lens group, and f is the focal length of the image readout lens, wherein the image readout lens further satisfies the following condition:

$$0.8 < |f_{23}|/f < 1.2$$

where $f_{23}$ is the resultant focal length of the second lens group and the third lens group.

2. An image readout lens comprising three lens groups of positive, negative and positive refractive power, in successive order from the object side, and a stop located between the second lens group and the third lens group, wherein:

the first lens group is formed of a lens having a convex surface on the object side;

the second lens group is formed of a lens made of an optical resin material having a convex surface on the object side;

the third lens group is formed of a lens made of an optical resin material having a convex surface on the image side;

at least one surface, of among the surfaces of the second lens group and the third lens group, is an aspheric surface; and the following conditions are satisfied:

$$55 < \nu 3 < 60$$

$$29 < \nu 2 < 33$$

$$0.41 < |f_2|/f < 1.1$$

$$0.95 < f_3/f < 1.3$$

$$f_1/f < 0.5$$

where $\nu 3$ is the Abbe number, at the d-line, of the optical material of a lens element in the third lens group, $\nu 2$ is the Abbe number, at the d-line, of the optical material of a lens element in the second lens group, $f_1$ is the focal length of the first lens group, $f_2$ is the focal length of the second lens group, $f_3$ is the focal length of the third lens group, and f is the focal length of the image readout lens.

3. The image readout lens according to claim 2, wherein the image readout lens further satisfies the following condition:

$$0.8 < |f_{23}|/f < 1.2$$

where $f_{23}$ is the resultant focal length of the second lens group and the third lens group.

* * * * *

UNITED STATES PATENT AND TRADEMARK OFFICE
CERTIFICATE OF CORRECTION

PATENT NO.    : 6,624,953 B2
DATED         : September 23, 2003
INVENTOR(S)   : Noda It is certified that error appears in the above-identified patent and that said Letters Patent is hereby corrected as shown below:

Column 6,
Line 57, change "FNO." to -- $F_{NO.}$ --;

Column 7,
Line 65, change "$F_{NO.}$" to -- $F_{NO.}$ --;

Column 9,
Line 10, change "$F_{NO.}$" to -- $F_{NO.}$ --;
Line 17, change "table hat" to -- table indicates that --;
Line 19, change "represents" to -- 1.0E-02" represents --; and Column 10,
Line 31, change "a-convex" to -- a convex --.

Signed and Sealed this

Second Day of December, 2003

JAMES E. ROGAN
*Director of the United States Patent and Trademark Office*